United States Patent
Mahler et al.

(10) Patent No.: US 7,724,175 B2
(45) Date of Patent: May 25, 2010

(54) METHOD FOR REDUCING INTERFERENCE SIGNAL INFLUENCES ON A HIGH-FREQUENCY MEASUREMENT DEVICE AND HIGH-FREQUENCY MEASUREMENT DEVICE

(75) Inventors: Michael Mahler, Leinfelden-Echterdingen (DE); Ulli Hoffmann, Nieffern-Oeschelbronn (DE); Reiner Krapf, Reutlingen (DE); Christoph Wieland, Herrenberg-Kuppingen (DE)

(73) Assignee: Robert Bosch GmbH, Stuttgart (DE)

( * ) Notice: Subject to any disclaimer, the term of this patent is extended or adjusted under 35 U.S.C. 154(b) by 668 days.

(21) Appl. No.: 10/585,379

(22) PCT Filed: Apr. 19, 2005

(86) PCT No.: PCT/EP2005/051707
§ 371 (c)(1), (2), (4) Date: Jul. 5, 2006

(87) PCT Pub. No.: WO2005/116683
PCT Pub. Date: Dec. 8, 2005

(65) Prior Publication Data
US 2009/0015459 A1  Jan. 15, 2009

(30) Foreign Application Priority Data
May 28, 2004 (DE) ........................ 10 2004 026 182

(51) Int. Cl.
*G01S 13/00* (2006.01)

(52) U.S. Cl. ............................. 342/22; 342/89; 367/97
(58) Field of Classification Search .................. 342/22, 342/89; 367/87, 93, 95–99
See application file for complete search history.

(56) References Cited

U.S. PATENT DOCUMENTS

| 5,194,865 | A  * | 3/1993 | Mason et al. ............... 341/132 |
| 6,834,073 | B1 * | 12/2004 | Miller et al. ............... 375/130 |
| 2004/0239305 | A1 | 12/2004 | Clauss et al. |
| 2005/0164638 | A1 | 7/2005 | Irion et al. |

FOREIGN PATENT DOCUMENTS

| DE | 39 05 735 | 8/1990 |
| DE | 199 15 016 | 5/2000 |
| DE | 102 07 424 | 9/2003 |
| DE | 102 33 835 | 2/2004 |
| WO | 01/93445 | 12/2001 |

* cited by examiner

*Primary Examiner*—Ian J Lobo
(74) *Attorney, Agent, or Firm*—Michael J. Striker

(57) ABSTRACT

A method for reducing interference signal influences on a high-frequency measurement device, in particular a method for operating a high-frequency position finder, in which an analog measurement signal (22) detected by a receiver unit (23) of the high-frequency measurement device is supplied to at least one analog/digital converter (28) of an evaluation unit for the measurement signal.

According to the present invention, the scan rate of the at least one analog/digital converter (28) is varied as a function of an interference signal measurement value correlated with the interference signals.

15 Claims, 1 Drawing Sheet

METHOD FOR REDUCING INTERFERENCE SIGNAL INFLUENCES ON A HIGH-FREQUENCY MEASUREMENT DEVICE AND HIGH-FREQUENCY MEASUREMENT DEVICE

CROSS-REFERENCE TO RELATED APPLICATION

The invention described and claimed hereinbelow is also described in German Patent Application DE 10 2004 026 1 82.2 filed on May 28, 2004. This German Patent Application, whose subject matter is incorporated here by reference, provides the basis for a claim of priority of invention under 35 U.S.C. 119(a)-(d).

BACKGROUND OF THE INVENTION

The present invention relates to a method for reducing interference signal influences on a high-frequency measurement device, and also to a corresponding high-frequency measurement device.

High-frequency measurement devices, which, for example, operate in accordance with the radar principle, are used, among other things, for locating objects in walls, roofs, or floors in order to avoid consequential damage caused by drilling, for example. Other potential uses for such devices include locating structural defects such as air pockets in the concrete or comparable defects in the material homogeneity of concrete coverings in bridges. These devices, which can also be embodied in the form of capacitive measurement devices, are likewise used in security technology in the context of area monitoring in order to supervise the presence or precise position of people. It is thus possible in the context of police or military uses, to locate people through a wall.

Another possible use for measurement devices of this kind is high-frequency distance measurement of the type used, for example, in the automotive field as parking assistance devices or driver assistance systems. This kind of high-frequency measurement devices can also be used for distance measurement in the construction field, for example for interior work in buildings. In this connection, it is in particular possible to produce hand-held distance measurement devices for manual laborers. The frequency range in which all of these devices are customarily operated lies between several hundred megahertz and over 100 gigahertz, i.e. in the microwave range.

Even in the range from 1 to 5 GHz, however, an increased amount of interference occurs, for example due to mobile telephones (GSM, GPRS, UMTS, DECT), wireless networks (WLAN, Bluetooth, wireless DSL) or microwave ovens. These interference sources reduce the quality of measurements of the above-mentioned high-frequency measurement device significantly or render measurement completely impossible. Consequently, it is no longer possible to prevent erroneous measurements that result in material damage and/or personal injury.

Previously used methods for avoiding erroneous measurements can in fact eliminate some interference sources through adroit collection of measurement data, but this is only with the presence of a few interference sources, which, in addition, must mostly also be active at the same time. These methods, however, fail to work when newly developed interference sources such as new radio technologies come into use.

DE 102 07 424 A1 has disclosed a method and device for locating enclosed objects, with which at least one captive sensor device generates a detection signal, which travels into the medium to be tested so that an evaluation of the detection signal, in particular through an impedance measurement, makes it possible to obtain information about objects enclosed in the medium. In the method disclosed in DE 102 07 424 A1, a measurement frequency in the GHz range is used in order to generate sufficiently large changes in the measurement signal, even for extremely low capacitance changes caused by the presence of an object enclosed in the medium. In the case of plastic pipes, an inclusion signal imparted by dielectrical inclusions typically lies in the sub-picofarad range so that these small changes in the capacitance to be measured, with an alternating voltage of for example one volt applied to the capacitive sensor and a measurement frequency of 100 kHz, result in differences in the displacement current of less than one microampere.

With the device in DE 102 07 424 A1, a device internal reference measurement is used in order to determine the level of external EMC interferences of the kind, for example, caused by nearby transmitters. Such EMC interferences can be subsequently calculated from an instantaneous measurement signal using the method from DE 102 07 424 A1.

DE 102 33 835 A1 has disclosed a method for eliminating interference from measurement signals that have been corrupted by pulsed interference signals with a known or determinable interference pulse interval. An elimination of the interference from interference sources that transmit in pulse-like fashion is achieved with the method according to DE 102 33 835 A1 in that at least three successive individual measurement values are recorded, with time intervals that differ from the interference pulse interval, and an interference-free measurement value is determined from the at least three individual measurement values.

SUMMARY OF THE INVENTION

The object of the present invention is to avoid erroneous measurements and functional interference in a high-frequency measurement device by reducing the influence of external interference sources on the high-frequency measurement device.

In the method according to the present invention for reducing interference signal influences on a high-frequency measurement device, an analog measurement signal detected by a receiver unit of the high-frequency measurement device is supplied for further signal evaluation to at least one analog/digital converter of an evaluation unit of the measurement device. Depending on an interference signal measurement value correlated with the interference signals, the scan rate of the at least one analog/digital converter is varied in order to reduce, as much as possible, the interference signal influences, i.e. the strength of the interference signals that are also detected by such a high-frequency measurement device.

If an analog/digital converter of the evaluation unit of a high-frequency measurement device has a fixed scan rate, then other radio services that function, for example, in "burst mode" (TDMA processes, mobile phones, etc.) can chronologically overlap with a measurement signal of a high-frequency measurement device or even operate in chronological synchronicity with the receiver/evaluation unit of the high-frequency measurement device and thus corrupt its wanted signal. A received signal scanned in this way, which can lead to corruptions of the measurement result, can no longer be used in an unlimited fashion.

If, for example, the external interference radiation is suitably measured before the actual measurement takes place, for example a position finding measurement, then it is possible to obtain information about the presence and strength of the interference in order to reduce the interference signal influences on the wanted signal. If this information indicates, for example, the presence of an interference source, then the method according to the present invention can be used to change the scan rate of an analog/digital converter of an evaluation unit for the measurement signal, i.e. for the wanted signal, and a subsequent measurement can be made to check whether the interference influence on the wanted signal, i.e. on the position finding measurement, decreases.

The method according to the present invention consequently eliminates pulse-emitted interference signal influences by adapting the scan rate (sampling rate) of a receiver unit of a high-frequency measurement device so that in the analog/digital conversion, measurements are taken, if possible, only between the pulses of the source or sources of external interference.

With the method according to the present invention, the scan rate of the at least one analog/digital converter is advantageously changed if the interference signal measurement value correlated with the interference signals exceeds a threshold value. Depending on the strength of the interference signals, a decision can be made as to whether or not a measurement with the high-frequency measurement device is practical or even possible. If the interference signal measurement value lies significantly above the threshold value, then the scan rate of the analog/digital converter is changed and a new measurement can be carried out.

In the method according to the present invention, the interference signal measurement value correlated with the interference signals is advantageously measured with the aid of the receiver unit of the measurement device. To this end, it is possible, for example, for a transmitter provided in the high-frequency measurement device to be switched off so that only external interference signals are detected by the receiver unit of the high-frequency measurement device. This eliminates the need for an additional unit for determining the interference signal influences.

The measurement of the interference signals with the changed scan rate is repeated if the measurement value correlated with the interference signals exceeds a predeterminable threshold value. This threshold value can, for example, be the inherent noise of the receiver unit or a value correlated with this inherent noise. The measurement of the interference signals can therefore be repeated with the changed scan rate until either a scan rate has been determined whose associated interference signal level, i.e. the corresponding interference signal measurement value, lies below the predeterminable threshold or, if this is not possible, until the successful ascertainment of the scan rate that has the lowest interference signal level, i.e. the lowest interference signal measurement value.

It is advantageous that the measurement of the interference signal level is begun with the maximum possible scan rate of the analog/digital converter, before successive decreasing of the sampling rate, since reduced scan rates result in a prolonged measurement duration and a reduced resolution of the measurement signal.

When determining the interference signal level, i.e. when determining the interference signal measurement value, it is possible either to observe certain frequency levels of the interference signal or also to add up the amplitudes of the individual interference signals over the entire bandwidth of the receiver unit. Advantageously, the entire frequency spectrum is used for the analysis so that it is possible, for example, to also take into account future interference sources that would transmit on currently unoccupied frequency bands. The frequency spectrum obtained from the interference signal measurement is evaluated and an interference signal level is quantified. For example, the frequency spectrum can be integrated and the interference signal measurement value thus obtained can then be compared to a previously established threshold, for example the inherent noise of the receiver unit.

Thus, for example, before the actual measurement of a wanted signal, for example before a measurement for locating objects, a corresponding measurement can be made in order to reduce the influence of the interference signals detected by the high-frequency measurement device. Depending on the strength of the interference signals, i.e. depending on the interference signal measurement value, a decision can be made as to whether or not a measurement is possible.

In alternative embodiment forms of the method according to the present invention, it is possible to vary the scan rate of an analog/digital converter during the measurement of a wanted signal, i.e. during a measurement with an activated transmitter/receiver unit, e.g. for locating objects, in order to thus reduce the interference signal influences on the measurement result.

The method according to the present invention is particularly used for operating a high-frequency measurement device, in particular a hand-held measurement device for locating objects. A measurement device of this kind correspondingly has at least one analog/digital converter for a measurement signal received by a receiver unit of the device, which signal is scanned for further signal processing. With the method according to the present invention, the scan rate of the at least one analog/digital converter can be variably adjusted.

In such a high-frequency measurement device according to the present invention, the variation of the scan rate of the at least one analog/digital converter is advantageously controlled by a microcontroller. Thus, for example, every time such a device is switched on, a routine can be automatically or manually started, which detects the instantaneous interference signal level and optimizes the scan rate in the above-described manner in order to reduce interference signal influences on the high-frequency measurement device.

The measurement frequency or frequencies of such a high-frequency measurement device lie in a range from 0.1 GHz to 10 GHz, in particular frequencies of 1 GHz to 5 GHz and preferably, frequencies in a frequency band from 1.5 GHz to 3.5 GHz, are used. High frequencies of this kind make it possible, for example, for a position finder to detect even extremely slight material differences, which can be advantageously used when detecting objects enclosed in a medium.

The method according to the present invention or a high-frequency measurement device that operates with the method according to the present invention reduces the influence of pulse-emitted interference signal influences by adapting the scan rate of the receiver unit so that measurements are taken, if possible, only between the interference pulses of the interference sources. In this connection, the scan rate is varied in such a way that a minimum of interference emission is found in the digital output data of the receiver unit or the interference signal is completely eliminated.

Other advantages of the method according to the present invention and of the measurement device according to the present invention ensue from the drawing and the accompanying description of an exemplary embodiment.

The drawing shows an exemplary embodiment for the method according to the present invention, which will be explained in greater detail in the description below. The figures in the drawing, their description, and the claims contain numerous defining characteristics in combination. Those skilled in the art will also consider these defining characteristics individually and unite them into other meaningful combinations that must therefore also be seen as having been disclosed herein.

DESCRIPTION OF PREFERRED EMBODIMENTS

Figure 1:
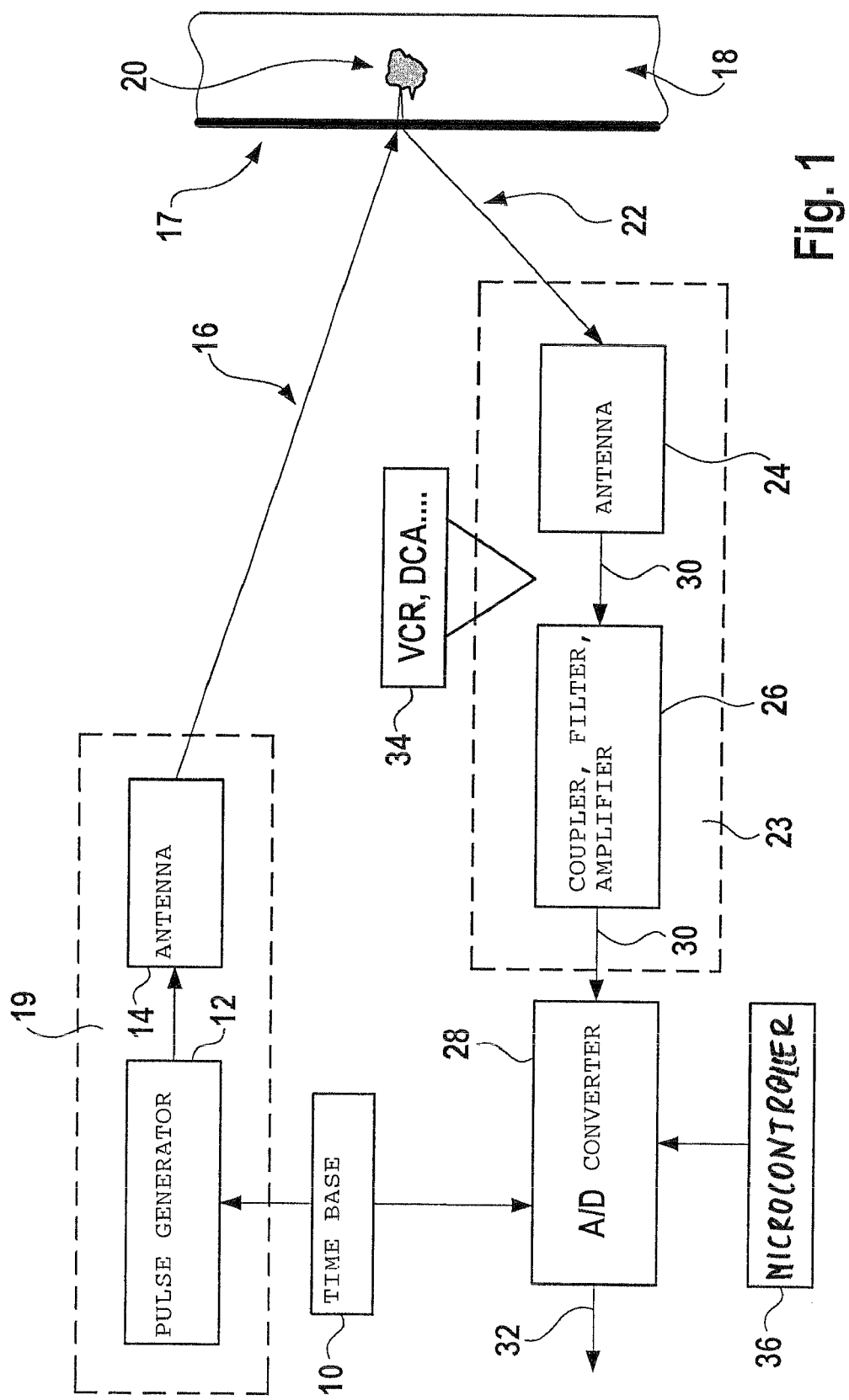
FIG. 1 is a simplified, schematic depiction of the basic design of a measurement device according to the present invention in order to illustrate the underlying method.

As an example of a measurement device according to the present invention, FIG. 1 shows the basic design of a high-frequency position finder in which a high-frequency generator emits pulses in the gigahertz range (microwaves, radar), which are entirely or partially reflected against boundary surfaces and are recorded again in the form of response pulses by a receiver unit of the measurement device and then evaluated.

A pulse generator 12 controlled by a time base 10 generates a chronologically short, spectrally wide voltage pulse in a transmitter unit 19 of the measurement device according to FIG. 1 and this pulse is coupled into an antenna device 14 of the transmitter unit by means of a wave coupler that is not shown in detail. The antenna 14 emits the corresponding electromagnetic radiation 16, which is partially reflected against boundary surfaces situated in close proximity to the transmitter unit 19.

If the high-frequency position finder is situated in close proximity to a medium, for example a wall 18, then in addition to the reflections against the surface 17 of the wall 18, this also produces corresponding reflections against objects 20 enclosed in the medium. A measurement signal 22 reflected in this manner is in turn detected by the measurement device by means of a receiver unit 23, which, among other things, also includes a receiver antenna 24. By means of the antenna 14 and possibly provided couplers, filters, or amplifiers of the receiver unit 23, which are schematically depicted in FIG. 1 as being combined into a single component 26, the receiver receives an analog signal 30 that is scanned in at least one analog/digital converter 28 of the measurement device.

The speed at which such a scanning occurs is referred to as the scan rate or sampling rate. A scan rate of for example 25 kHz corresponds to 25,000 measurement values per second. The "sampling" in the analog/digital converter 28, i.e. the conversion of the analog incoming signals 30 into digital output signals 32, can therefore be significantly slower than the master clock rate (e.g. 8 MHz) of the transmitter unit 19 and/or receiver unit 23 predetermined by the time base 10. Within this time, data can, for example, be subjected to noise suppression until the analog/digital converter digitizes these data.

With the method according to the present invention, the returning measurement signals 30 detected by the receiver antenna 24 are first amplified in a high-frequency amplifier of the component 26 of the receiver unit 23 of the measurement device. Then, the voltage signals of the measurement signal 30 are scanned at defined points in time. A scanning pulse predetermines the times at which the voltage is measured. Since the voltage signal is evaluated in terms of both its value and phase, and consequently a determination of the phase of the reflected voltage is executed in relation to the phase of the voltage generated by the pulse generator, it is important for the generator 16 of the transmitter signal and the generator of the scanning pulse for the analog/digital converter 28 to be phase coupled. This is assured through the use of the time base 10.

After the analog/digital converter 28, the currently digitized measurement signal 32 is then sent to a digital signal processor, not shown in FIG. 1, for further signal processing and evaluation. This digital signal processor handles both the further signal processing and the control of the time base 10 in order to generate both the excitation pulse and the scan pulse.

If the scan rate on the receiver side is fixed or predetermined, then in a high-frequency position finder, other radio services such as mobile phones that function in "burst mode" could chronologically overlap with the scanned measurement signals or even run synchronously with these measurement signals and would thus corrupt the measurement signal. A received signal 30 scanned in this way would thus no longer be usable since it would lead to corruptions of the measurement result.

Occurring interference emission is roughly differentiated into continuous interference sources (CW or CDMA code division multiple access) and pulse-emitted interference sources (TDMA time division multiple access). The method according to the present invention now eliminates the influence of pulse-emitted interferences on the measurement signal by adapting the scan rate on the receiver side so that if possible, measurements are taken, i.e. the analog-to-digital conversion is executed, only between the pulses of the external interference sources.

To this end, for example before the beginning of an actual position finding measurement, the transmitter or transmitter unit 19 of the high-frequency measurement device is switched off. Consequently, the receiver unit 23 registers only external interference signals. If the external interference radiation is measured before the measurement of the wanted signal, then it is possible to obtain information about the presence and strength of interference frequencies. If this information indicates the presence of an interference source, then in the method according to the present invention, the scan rate of the analog/digital converter 28 is changed and a subsequent measurement is carried out to ascertain whether the interference influence decreases. In this connection, the scan rate for the analog/digital converter 28 can be varied until a minimum amount of interference radiation is present in the digital output data 32 of the receiver unit or until the interference is reduced below a predeterminable threshold.

In this connection, it is possible, for example, to only take into consideration certain frequency levels of the frequency spectrum of the interference radiation. Alternatively, however, it is also possible to take measurements over the entire spectral bandwidth of the receiver unit and for the amplitudes of the interference signals to be added up in order to obtain an interference signal measurement value. In the method according to the present invention, it is preferable for the entire frequency spectrum to be advantageously used for the analysis. This has the advantage of making it possible to also take into account future interference sources that would transmit on currently unoccupied frequency bands.

The frequency spectrum of the interference radiation detected in this way can, for example, also be integrated in order to obtain a value for the interference signal level. Then in a routine, for example of a digital signal processor, this interference signal measurement value can be compared to a previously established threshold, for example the inherent noise of the receiver unit. Depending on the strength of the interference signals, i.e. depending on the interference signal measurement value thus determined, a measurement routine can decide whether a measurement is practical, possible, or impractical.

If the interference signal measurement value lies significantly above the threshold value, for example, then the scan rate of the analog/digital converter is changed by an automatic routine and a new measurement of the interference signal level is carried out. This can be carried out once or more often, either until determination of an analog/digital converter scan rate whose associated interference signal measurement value lies below the predetermined threshold value or, if this cannot be achieved within a predeterminable time span, until determination of the scan rate, which, during the defined time interval, has generated the lowest interference signal level, i.e. the lowest interference signal measurement value.

Ideally, the process begins with the maximum possible scan rate of the analog/digital converter before this rate is successively decreased, since lower scan rates result in a prolonged measurement duration. The variation of the scan rate of the analog/digital converter can advantageously be executed by a microcontroller 36.

If a scan rate for an analog/digital converter 28 has been established in this manner and has lead to a reduced interference signal influence, then the transmitter unit 19 of the measurement device according to the present invention can be reactivated so that, for example, a position finding measurement can be taken by transmitting a pulse 16 via the antenna 14 and detecting the returning measurement signal 22 with the aid of the receiver antenna 24.

With the method according to the present invention, it is possible for this to occur automatically when the corresponding high-frequency measurement device is switched on, in order to immediately set the measurement device to the optimum scan rate of the analog/digital conversion that results in the best possible reduction in the instantaneous interference signal influences. The determination of the interference signal measurement value and the optimization of the scan rate in order to reduce interference signal influences can, however, also be manually activated in the context of a calibration measurement by the user of such a measurement device.

Alternatively, a method can also be provided, which adapts the scan rate for the analog/digital conversion of a high-frequency measurement device during the actual measurement process. This means that before the actual measurement, for example the locating of an object enclosed in a medium, no separate interference signal measurement is carried out, but instead, operation occurs directly with an activated transmitter unit and an activated receiver unit. In this instance, during the position finding measurement, the scan rate of the analog/digital conversion, for example starting from the maximum possible scan rate, is successively reduced and a digital signal processor selects the scan rate that produces the best measurement result, i.e. the best wanted signal. For example, if a pattern recognition process is used in the context of a position finding measurement, then it is simple to establish a criterion for the presence of favorable measurement results.

The above-described method according to the present invention is able to effectively suppress pulsed interference sources and to minimize their effect on the measurement result of high-frequency measurement devices.

Continuously emitting interference sources can be effectively suppressed by the signal processing of the measurement device. But interference sources of this kind, with their noise-like signal, cause an increase in a signal level, resulting in overmodulation of components in the receiver unit, e.g. an amplifier or an A/D converter. In order to prevent a clipping, i.e. an overmodulation, it is possible here to insert a variably adjustable resistor of the kind represented by the component 34 in FIG. 1 before the amplifier, the A/D converter, or other components used to evaluate the measurement signal. This component can, for example, be a VCR element (voltage-controlled resistor) or a DCA element (digital-controlled amplifier).

The VCR element or DCA element can then be controlled using the above-described method for ascertaining and minimizing the interference signal measurement value in that the measurement device ascertains the interference signals at various scan rates of at least one analog/digital converter. In this way, the measurement signals are always scanned in an uncorrupted manner.

With the method introduced here for avoiding or reducing interference signal influences from pulse-emitted or continuously emitted interference sources, it is possible to optimize high-frequency measurement devices and to deliver largely uncorrupted measurement results. Moreover, in the event of interference sources that cannot be compensated for, the control loops permit a more reliable protection against erroneous measurements since they furnish the user of such a measurement device with a warning, possibly even before interferences occur, and can optionally disallow a measurement by means of an automatic circuit.

The method according to the present invention and the measurement device according to the present invention are not limited to the embodiment form depicted in FIG. 1. In particular, the method is not limited to the variation of the scan rate of only one analog/digital converter. Correspondingly, it is also possible to operate a plurality of converters.

The method according to the present invention and the corresponding measurement device are not limited to position measurements of an object enclosed in a medium.

In principle, the method according to the present invention can be used in any high-frequency measurement device. In addition to high-frequency measurement devices for position finding, this also particularly includes devices for monitoring areas and people and also includes devices for locating living organisms through a wall. Another potential use for the method according to the present invention is in high-frequency distance measurement of the type used, for example, in the automotive field as parking assistance devices or driver assistance systems or also for mobile distance measurement in the construction field. The frequency range at which these devices operate is usually in the microwave range.

What is claimed is:

1. A method for operating a high-frequency measurement device, in which an analog measurement signal (22) detected by a receiver unit (23) of the high-frequency measurement device is supplied to at least one analog/digital converter (28) of an evaluation unit for the measurement signal (22), wherein an interference signal is measured and an interference signal measurement value is determined, wherein the scan rate of the at least one analog/digital converter (28) is varied as a function of the determined interference signal measurement value correlated with the interference signals so as to reduce an influence of external interference sources on the high-frequency measurement device.

2. The method as recited in claim 1, wherein the scan rate of the at least one analog/digital converter (28) is changed if the interference signal measurement value correlated with the interference signals exceeds a threshold value.

3. The method as recited in claim 1, wherein the interference signal measurement value correlated with the interference signals is measured with the aid of the receiver unit (23) of the measurement device.

4. The method as recited in claim 3, wherein the measurement of the interference signals with the changed scan rate of the at least one analog/digital converter (28) is repeated if the measurement value correlated with the interference signals exceeds a predeterminable threshold value.

5. The method as recited in claim 3, wherein the measurement of the interference signals with the changed scan rate of the least one analog/digital converter (28) is repeated until a scan rate with a minimum interference influence is achieved.

6. The method as recited in claim 1, wherein the scan rate of the at least one analog/digital converter (28) is varied, starting from a high scan rate and moving toward lower scan rates.

7. The method as recited in claim 1, wherein during a measurement of the interference signals, the entire spectrum of interference signal frequencies that the bandwidth of the receiver unit (23) is capable of detecting is used in order to determine the measurement value correlated with the interference signals.

8. The method as recited in claim 1, wherein in a measurement of the interference signals, selective interference signal frequencies within the bandwidth of the receiver unit (23) are used in order to determine the measurement value correlated with the interference signals.

9. The method as recited in claim 7, wherein the frequency spectrum detected during a measurement of the interference signals is evaluated and the resulting measurement value correlated to the interference signals is compared to a predeterminable threshold value.

10. The method as recited in claim 1, wherein before a measurement for locating objects (20), at least one measurement is carried out to identify interference signals.

11. The method as recited in claim 1, wherein a variably adjustable component (34) of the receiver unit (23), which component influences the signal amplitude of the measurement signal (30), is set in accordance with the interference signal measurement value correlated with the interference signals in order to prevent a clipping of the measurement signal to be evaluated from occurring in the receiver branch.

12. A high-frequency measurement device, having a transmitter unit (19) for generating and transmitting a measurement signal (16), having a receiver unit (23) for detecting a returning measurement signal (22), and having a control and evaluation unit that includes at least one analog/digital converter (28) for a measurement signal (22) detected by the receiver unit (23), which measurement signal is scanned for further signal processing, wherein an interference signal is measured and an interference signal measurement value is determined, wherein the scan rate of the at least one analog/digital converter (28) is variably adjustable as a function of the determined interference signal measurement value correlated with the interference signals so as to reduce an influence of external interference sources on the high-frequency measurement device.

13. The high-frequency measurement device as recited in claim 12, wherein the measurement signal (16) generated by the transmitter unit (19) has more than one measurement frequency.

14. The high-frequency measurement device as recited in claim 12, wherein at least one measurement frequency of the measurement signal (16) generated by the transmitter unit (19) lies in a range from 100 MHz to 10,000 MHz, in particular in a range from 1,000 MHz to 5,000 MHz, and preferably in a range from 1,500 MHz to 3,500 MHz.

15. The high-frequency measurement device as recited in claim 12, wherein a microcontroller (36) is provided, which controls the variation of the scan rate of the least one analog/digital converter (28).

* * * * *